(12) United States Patent
Davis et al.

(10) Patent No.: US 11,448,399 B2
(45) Date of Patent: Sep. 20, 2022

(54) STANDING PILOT IGNITER FOR OILFIELD SEPARATORS

(71) Applicant: Dragonfire Technologies, Inc., Farmington, NM (US)

(72) Inventors: Ryan Davis, Farmington, NM (US); Steven Strohl, Cedar Crest, NM (US); Ty Davis, La Plata, NM (US); William F. Clark, Farmington, NM (US)

(73) Assignee: Dragonfire Technologies, Inc., Farmington, NM (US)

( * ) Notice: Subject to any disclaimer, the term of this patent is extended or adjusted under 35 U.S.C. 154(b) by 316 days.

(21) Appl. No.: 16/690,834

(22) Filed: Nov. 21, 2019

(65) Prior Publication Data

US 2020/0158336 A1 May 21, 2020

Related U.S. Application Data

(60) Provisional application No. 62/770,700, filed on Nov. 21, 2018.

(51) Int. Cl.
*F23G 7/08* (2006.01)
*F23N 1/00* (2006.01)
(Continued)

(52) U.S. Cl.
CPC ............ *F23G 7/085* (2013.01); *F23N 1/002* (2013.01); *F23N 5/242* (2013.01); *F23N 5/247* (2013.01);
(Continued)

(58) Field of Classification Search
None
See application file for complete search history.

(56) References Cited

U.S. PATENT DOCUMENTS

| 1,023,438 A | 4/1912 | Muncaster |
| 4,154,571 A | 5/1979 | Pariani |

(Continued)

FOREIGN PATENT DOCUMENTS

| CN | 2549343 | 5/2003 |
| CN | 200993369 | 12/2007 |

(Continued)

*Primary Examiner* — Jason Lau
(74) *Attorney, Agent, or Firm* — Peacock Law P.C.; Philip D. Askenazy

(57) ABSTRACT

An electronically controlled burner management system for oilfield separators. The system includes an autonomous standing pilot spark ignition that includes a self-aligning clamp that holds the igniter to the burner nozzle. The self-aligning clamp enables rapid installation and removal, lowering the total cost of ownership. The autonomous spark ignition system incorporates temperature sensors to determine when the standing pilot needs to be relit, and can shut off the gas or other fuel flow to the standing pilot and the main burner when the pilot is not lit. The system increases oil and gas production from the well, reduces fugitive emissions of unburned gas, and improves oilfield worker safety. When installed or retrofitted into an existing oilfield separator, the original burner control components are left in place, allowing the user to revert to traditional operation in case of failure of any electronic component of the present system.

15 Claims, 15 Drawing Sheets

(51) Int. Cl.
*F23N 5/24* (2006.01)
*F23Q 9/14* (2006.01)

(52) U.S. Cl.
CPC ............ *F23Q 9/14* (2013.01); *F23N 2227/30* (2020.01); *F23N 2229/02* (2020.01)

(56) References Cited

U.S. PATENT DOCUMENTS

| | | | |
|---|---|---|---|
| 4,717,333 | A | 1/1988 | Carignan |
| 5,938,426 | A | 8/1999 | McGehee |
| 6,726,163 | B2 | 4/2004 | Eppard et al. |
| 2006/0118644 | A1 | 6/2006 | Davis |
| 2007/0160944 | A1* | 7/2007 | Knight .................... F23Q 3/006 431/278 |
| 2007/0241071 | A1 | 10/2007 | Antonioni et al. |
| 2009/0081334 | A1 | 7/2009 | Moore |
| 2011/0003258 | A1* | 1/2011 | Carlson .................. F23N 5/102 431/278 |
| 2013/0280664 | A1 | 10/2013 | Parks |
| 2015/0071790 | A1 | 3/2015 | Tieke et al. |
| 2016/0209032 | A1 | 7/2016 | Loveless et al. |
| 2018/0363950 | A1* | 12/2018 | Bailey .................. F24H 9/2035 |
| 2019/0330031 | A1 | 10/2019 | Walker et al. |

FOREIGN PATENT DOCUMENTS

| | | |
|---|---|---|
| CN | 203421727 | 2/2014 |
| CN | 203656943 | 6/2014 |
| CN | 203771453 | 8/2014 |

\* cited by examiner

STANDING PILOT IGNITER FOR OILFIELD SEPARATORS

CROSS-REFERENCE TO RELATED APPLICATIONS

This application claims priority to and the benefit of the filing of U.S. Provisional Patent No. 62/770,700, filed on Nov. 21, 2018, entitled "Pilot Light Igniter for Oilfield Separators", and the specification and claims thereof are incorporated herein by reference.

BACKGROUND OF THE INVENTION

Field of The Invention (Technical Field)

The present invention relates to methods and devices for retrofitting, installing and operating a standing pilot ignition system for oilfield separators.

Background Art

Note that the following discussion may refer to a number of publications and references. Discussion of such publications herein is given for more complete background of the scientific principles and is not to be construed as an admission that such publications are prior art for patentability determination purposes.

The production of oil and gas wells results in the extraction of a mixture of water, crude oil, natural gas and particulates. This multiphase fluid mixture flows or is pumped to an oilfield separator for the purpose of separating the natural gas from the liquids and subsequently separating the liquids into a water phase and an oil phase. Particulates, if present, will leave the separator in either the water or oil phase. Floats, or other types of sensors, are used to open and close dump valves to ensure the separator does not allow liquids into the gas outlet. Gravity separation in the separator allows the oil to be sent to the steel storage tank (to be sold) and the water to the waste fluid tank for appropriate disposal.

Separators are designed in direct and indirect heat configurations. In the direct heat configuration, process heat is directly applied to the produced fluids through a submerged fire tube inside the pressure rated vessel. In an indirect heat configuration, the heat is applied to the produced fluids in coils that pass through an adjoining section, called the heated water bath. The heated water bath typically utilizes a glycol-based fluid to prevent freezing, i.e. antifreeze. Separators are also designed in two- or three-phase configurations. In the two-phase configuration the separator will separate the fluid and gaseous phases. The three-phase configuration is capable of separating the oil, water and gas phases. Based on the vessel configuration, oil/gas separators can be designed for high gas flow rates (a horizontal pressure vessel) or for high liquid flow rates (a vertical pressure vessel). However, most separators are three-phase with a horizontal pressure vessel configuration. Depending on the needed process separation functions, oil/gas separators can also be designed or classified as a primary phase separator, a test separator, a high-pressure separator, a low-pressure separator, a deliquilizer, a degasser, etc. As used throughout the specification and claims, the term "separator" means oilfield separator, oil/gas separator, primary phase separator, test separator, high-pressure separator, low-pressure separator, two-phase separator, three-phase separator, deliquilizer, degasser, and the like. To meet process requirements, the oil/gas separators are normally designed in stages, in which the first stage of the separator is used for preliminary phase separation and the second stage of the separator is used for further treatment of each individual phase (gas, oil and water). Most separators do not have electrical power for process control. Rather, separators typically use pneumatic devices, powered by supply gas (natural gas sourced onsite), that sense, monitor, and control the process temperature. Additionally, separators use pneumatic liquid level controllers to operate the dump valves sending out the oil and water. The process heat of a typical separator has two main functions. When the ambient temperature is freezing, the process heat insures a continuous production flow. Secondly, the process heat provides sufficient heat to break down emulsified oil/water, if present. To accomplish these functions, separators have a built-in fire tube and burner assembly to transfer heat to the pressure vessel directly or to the water bath.

In cold climates, the water layer in the separator vessel can freeze during the winter, causing the system to flood and production to be impeded or shut off. When the water inside the separator freezes, the dump valves are unable to function and produced oil and water can fill up into the gas compartment, resulting in a myriad of problems for the well's operator. This typically results in the loss of natural gas production and more freezing problems in natural gas gathering pipelines. Additionally, as more oil/water mix continues to be added to the separator, the mixture must exit through the gas or oil line which can result in a "spill" requiring clean up.

Therefore, a fire tube and burner system is almost always incorporated into the base design of a separator so that when the standing pilot remains lit, the separator will not freeze. Then the burner and temperature control system will provide sufficient heat for the separator to process the production as designed. In climates that are cold in the winter, but don't necessarily reach freezing temperatures, the process heat may be utilized to ensure the fluid mixture separates faster and more completely. However, overheating the fluid in the water bath is not desirable, so controls are generally incorporated to turn the heat on when a lower temperature threshold has been reached and turn the heat off when an upper temperature threshold has been achieved.

A typical oil/gas separator, as shown in FIGS. 1-2, comprises vessel 6, burner tube 16, burner access port 15, burner housing 7, burner housing access port 10, burner housing access port cover or plate 8, exhaust stack 54, and flame arrester housing 17. Such a system also typically comprises a burner system, shown in FIG. 3, which does not comprise any electronics and which controls the temperature of separator vessel 6 solely by the means of pneumatic thermostat 11, which utilizes thermal expansion rod 27 in direct contact with produced fluid 28 in separator vessel 6. The length of this rod is directly responsible for the opening or closing of a valve directing the control gas pressure to pressure open valve 12. If the vessel temperature drops beneath the set threshold of pneumatic thermostat 11, the thermal expansion rod contracts to a proportional length, opening the thermostat valve supplying pressure to pressure open valve 12 and thus opening gas flow 21 to the main burner 31. A lit pilot burner 30 will ignite gas flow 21 to main burner 31, which increases the temperature of vessel fluid 28 to a point satisfying pneumatic thermostat 11. Once satisfied, thermal expansion rod 27 expands to a point that shuts off and vents the gas pressure holding pressure open valve 12 open. This action ceases gas flow to main burner 31. This system, which comprises a pneumatic thermostat and a pilot burner, is referred to herein as utilizing traditional control.

Oilfield separators typically process the produced fluids (natural gas, produced water and crude oil) 24 hours per day and the loss of process heat creates problems and decreases revenue. A standing pilot flame is the typical method used to ignite the separator's main burner. Depending on the characteristics of the well's produced fluids (natural gas, crude oil and produced water), the standing pilot might only be needed during the cold weather months. However, if the well's fluid character creates an emulsion, then additional process heat is required all the time and it is very important for the standing pilot to remain lit. Any time during the year, fuel gas supply interruption or strong or gusting winds might extinguish the standing pilot. And when the ambient temperature is cold there may be variations in the fuel gas composition which may cause the standing pilot to go out. For example, burners and standing pilot flames are typically fired with natural gas (fuel gas) that is derived directly from the high-pressure gas compartment of the separator. This natural gas is saturated (typically with water vapor and natural gas liquids), and its precise composition can vary. As a result, the standing pilot flame may extinguish if there is a change in the air-fuel mixture, even momentarily. When the standing pilot is extinguished typical systems in the field today will vent natural gas to the atmosphere since there are no sensors and controls on the separator to detect that the standing pilot is out. If the flame of pilot burner 30 is lost and pneumatic thermostat 11 calls for a temperature increase of separator vessel 6, it opens pressure open valve 12 and the unignited gas flows to main burner 31 and then is exhausted to the atmosphere unburned. In addition to wasting fuel gas and producing polluting emissions, depending on the ambient temperature, the process vessel may freeze, and the production from the well will cease. Even if the water layer does not freeze, the system will continue to exhaust unburned gas until the standing pilot is relit or ambient temperatures rise to a point where the upper temperature threshold is reached. Any such scenario results in undesirable production downtime.

Typical separators in use today do not monitor the standing pilot flame presence, and if it goes out human intervention is required for it to be relit. Pilot burner 30 is typically initially lit, and relit, by first opening the pilot gas valve and then manually inserting an open flame, such as a butane type torch, into burner tube 16 through burner tube access port 15 and turning on the fuel gas supply. When the torch gets close to the tip of the standing pilot, the sound of the gas igniting is heard, and the torch is removed from the separator. On rare occasions, the unburned gas from an extinguished standing pilot can build up to a level that creates a safety hazard for a person trying to ignite the standing pilot. In rare instances, the person attempting to ignite the standing pilot has been burned.

In addition, traditional control burner systems without electronic control can have poor accuracy. In instances of oversized burner systems, or wells with low or inconsistent fluid production, excessive heat can be transferred into the separator vessel fluid. Even when the fluid is at a desired temperature and fuel supply to the main burner has ceased, in the interest of retaining the standing pilot flame for future cycles, the pilot remains lit. Though the rate of heat transfer is significantly decreased with the main burner shut off, heat transfer from the pilot flame continues. If the incoming fluid rate is lower than required to balance or overcome the standing pilot flame's heat transfer rate, the vessel-contained fluid temperature can be driven higher than the temperature set on the pneumatic thermostat. This excessive temperature decreases the quality of fluids produced.

In summary, use of the separator's process heat depends on the ambient temperature and the character and volume of the produced fluids being processed. In the winter, when steady heat is typically required the standing pilot burns continuously and the main burner is on or off as necessary to maintain the optimum temperature in the unit. Depending on other factors (such as oil/water emulsions and rates), the pilot may be in use during the entire year with the main burner shut off during warm months. Keeping the standing pilot lit when required by the process is critical to the successful operation of the separator and maximizes revenue to the well's owner.

There are approximately one million operational oil and gas wells in the United States (US) alone. Nearly every well has a separator for the initial treatment for the oil and/or gas immediately after it has been extracted from beneath the surface. Very few (less than 1%) of the separators in the US have an automated and autonomous system installed to ignite the standing pilot which is used to ignite the main burner. There are many different types of burners in the oilfield today. Some are between 50 and 100 years old. Other were installed very recently. As a result, developing a standing pilot ignition system that can be quickly and easily installed or retrofitted on any type of separator in the field is challenging.

Current practice as it relates to the operation of oilfield separators is driven by operational cost for each individual well. Regulatory costs for emissions and costs associated with abating those emissions can be a significant factor in the profitability of a well. Oilfield worker safety also can play a role. Current practice is non-optimal from a personnel safety perspective due to accidents involving flash, non-optimal from a revenue perspective (reduced efficiency of separation and production), and non-optimal from the regulatory/environmental perspective (fugitive gas emission). Environmental regulations may further exacerbate the problem by requiring that practices to control or reduce these fugitive gas emissions be implemented.

One alternative to lighting of the pilot burners using the handheld torch, available today, is called a burner management system (BMS). A BMS controls the fuel flow to the burner assembly using flame sensors, valves, solenoids, a master controller, and some type of ignition system at the burner. To retrofit an existing burner with a BMS requires removal and replacement of existing parts (burner housings, fuel control valves, etc.) and is relatively expensive both to purchase and install. In addition, most BMS systems require a dedicated port of access, which in turn requires cutting and/or welding to be done in the field. For example, in two typical burner management systems, shown in FIG. 4 and FIG. 5, pneumatic thermostat 11 is replaced by temperature probe 33. This system is thus dependent on operational controller 19 for vessel temperature control. These systems also comprise flame sensor 60, ignition element 9, pressure sensor 13, and electronically controlled valves 23. These system's controllers 19 access the interior of separator burner housing 7 through means of dedicated burner housing port 34, which requires cutting and/or welding to be done in the field. The BMS of FIG. 5 does not have a pilot burner 30 assembly; instead main burner 31 is ignited directly. Successful direct ignition of the main burner 31 requires the electronic valve to be of the proportional variety; in this way, gas velocity can be slowed for ignition but then increased for heat demand. However, a pneumatic thermostat and pilot burner assemblies are essential for traditional control. In both FIG. 4 and FIG. 5, in the event of a failure of controller 19 or other electronic components of the BMS such as temperature probe 33, the separator cannot be reverted to traditional control since there is no pneumatic thermostat, the BMS of FIG. 5 doesn't use a pilot burner, and the BMS's of both FIG. 4 and FIG. 5 comprise electronic valves 23 that are not bypassable. Thus in that event the system will remain inoperable until a repair to the controller or electronics is made. These BMS's require an operational controller for gas flow in the pilot burner line (if present) and the main burner line, and ignition. Current burner management solutions on the market today are too expensive for wide deployment in most regions.

Simple spark ignition systems have been designed and offered for sale, but there are several issues that arise with these solutions. Spark ignition systems require electrical power, and that requires spare batteries to be available in the field, and/or a solar powered rechargeable battery. Either option can fail over a period of several years, leading to a non-operational state for the standing pilot igniter. Secondly, installation of spark ignition systems often requires specialized tools or require significant customization due to the wide variety of the separator designs installed across the world's oilfields. This drives up the labor time required for installation and necessitates specialized training for the installer. These factors drive up the cost. Thirdly, spark ignition systems create a burner system that is dependent on an operational controller. Because a large amount of oilfield locations are in remote areas, a failed spark ignition system is often simply bypassed, which requires re-plumbing of control lines and replacement of parts; spark ignition systems are often left in this state. For these reasons, the vast majority of separators do not have an operational standing pilot ignitor system.

An automatic standing pilot ignitor system that is easy, cost-effective and safe to install, operate and maintain in the field is therefore desirable. The burner ignition system should be adaptable to allow quick installation on a vast majority of the separators in the field today, regardless of their age or manufacturer. It is further desired that the system does not require any component deletion and, once installed, does not preclude manual torch lighting of the pilot should the automated system become non-operational.

SUMMARY OF THE INVENTION
(DISCLOSURE OF THE INVENTION)

An embodiment of the present invention is a system for managing a separator pilot burner, the system comprising a flame sensor; an ignition element; a support for holding the flame sensor and the ignition element; a clamp for clamping the support to the pilot burner; a first sensor, the first sensor configured to measure a property of fuel being supplied to the pilot burner; and a controller; wherein the system does not comprise an electronic temperature sensor for monitoring a temperature within the separator. The system preferably comprises a feedthrough for passing electrical wiring between the controller and both the flame sensor and the ignition element through a burner housing access port plate. The feedthrough preferably mounts the controller to the burner housing access port plate. The first sensor is preferably a flow sensor or a pressure sensor. The system preferably comprises a first bypassable electronic valve for controlling a flow of fuel to the pilot burner. The first bypassable electronic valve is preferably a non-venting latching solenoid valve. The system preferably comprises a second bypassable electronic valve installed between a pneumatic thermostat and a pressure open valve, the pneumatic thermostat configured to measure the temperature within the separator, and the pressure open valve configured to use an output of the pneumatic thermostat to control a flow of fuel to a separator main burner. The second bypassable electronic valve is preferably a three-way venting latching solenoid valve. The pneumatic thermostat and the pressure open valve were preferably originally installed on the separator. The system preferably comprises a second sensor, the second sensor configured to measure a property of fuel being supplied to a separator main burner. The second sensor is optionally installed downstream of the pressure open valve, in which case it is preferably a flow sensor or a pressure sensor. The second sensor is optionally a pressure sensor installed upstream of the second bypassable electronic valve. The system preferably comprises a third sensor installed downstream of the second bypassable electronic valve, the third sensor being a pressure sensor. The second sensor and the third sensor are preferably wired in parallel. Th system alternatively comprises a pressure transducer installed downstream of the pneumatic thermostat. The system preferably comprises liquid-tight flexible conduit containing electrical wiring between the controller and system components installed outside a body of the separator.

Another embodiment of the present invention is a method of installing a burner control system on a separator, the method comprising installing an ignitor assembly on a pilot burner of the separator through a burner housing access port on the separator; feeding electrical wiring from a controller to the ignitor assembly through a burner housing access port cover; wherein the method is performed without removing a pneumatic thermostat configured to measure a temperature within the separator. The ignitor assembly preferably comprises a flame sensor, an ignition element, a support for holding the flame sensor and the ignition element, and a clamp for clamping the support to the pilot burner. The installing step preferably comprises placing the flame sensor relative to the pilot burner so that when the pilot burner is lit the flame sensor will be directly immersed in a pilot flame. The burner housing access port cover was preferably originally installed on the separator, in which case the feeding step comprises drilling a hole through the burner housing access port cover. Alternatively the method comprises replacing an original burner housing access port cover. The method preferably comprises installing a feedthrough through a hole in the burner housing access port cover and preferably comprises attaching the controller to the burner housing access port cover. The feedthrough preferably comprises threads for receiving a nut, the threads extending into the controller after installation. The method preferably comprises installing one or more sensors and one or more electronic flow valves on one or more fuel supply lines exterior to a body of the separator. The method preferably comprises installing liquid-tight flexible conduit containing electrical wiring between the controller and the one or more sensors and one or more electronic flow valves.

Another embodiment of the present invention is a method of operating a burner management system for a separator, the method comprising detecting when an output pressure from a pneumatic thermostat, which is configured to measure the temperature within the separator, exceeds a first predetermined pressure because the temperature of the separator is below a predetermined value; ensuring fuel is not flowing to the main burner or the pilot burner; flowing fuel to the pilot burner; igniting the pilot burner; waiting until a flame sensor measuring the pilot flame reaches a predetermined temperature; flowing fuel to the main burner; and igniting the main burner; wherein the forgoing steps are performed under electronic control. The method preferably further comprises manually operating the separator in the event of a failure of an electronic component, preferably including manually lighting a pilot flame and continuing to use the pneumatic thermostat to measure the temperature within the separator. The method preferably comprises priming a pilot burner prior to igniting the pilot burner. The ensuring step preferably comprises closing an electronic valve between the pneumatic thermostat and a pressure open valve if fuel is flowing to the main burner, venting fuel from the electronic valve, and optionally cycling the electronic valve on and off to remove residue from the valve. The method preferably comprises delaying flowing fuel to the pilot burner to allow any unburnt fuel to dissipate. The method preferably comprises stopping a flow of fuel to the pilot burner if the pilot burner does not ignite after a predetermined number of attempts; waiting until flooding of the pilot burner has dissipated; and flowing fuel to the pilot burner. The method optionally comprises inducing a controller to enter an idle state by manually closing a valve on a pilot burner fuel supply line. The method preferably comprises stopping a flow of fuel to the main burner, and optionally the pilot burner, when the pneumatic thermostat reaches a second pressure lower than the first pressure because the temperature in the separator is above a predetermined value.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

The present invention relates to methods and devices for oilfield separator burner management systems, and more specifically, to standing pilot ignition systems. More particularly, but not by way of limitation, the present invention relates to methods and devices for installing and operating a standing pilot ignition system in a manner that improves oilfield worker safety, increases production of oil and gas from the well, reduces oilfield maintenance requirements, and reduces fugitive emissions to the environment from the separator.

One or more embodiments of the separator standing pilot ignition system of the present invention incorporate the following features, which alone or in combination, address some or all of the shortcomings of the products currently on the market. Embodiments of the present invention preferably: a) are installable without specialized training or specialized equipment; b) can be relit manually by an electronic standing pilot ignition assembly or, if the assembly is equipped with wireless communications, remote wireless electronic ignition; c) have automated re-light capability if the standing pilot is extinguished by wind or by a bolus of low-grade gas incapable of supporting a flame; d) are capable of automatically shutting off the burner gas whenever the standing pilot is not burning, and/or e) can be relit using the standard torch method, without removing or modifying the electronic ignition system, should the automated system become non-operational for any reason. With respect to the last point, the ability to revert to traditional control without special tools and without expending labor or well downtime to reconfigure the separator can be important for efficient oilfield operations.

Figure 6:
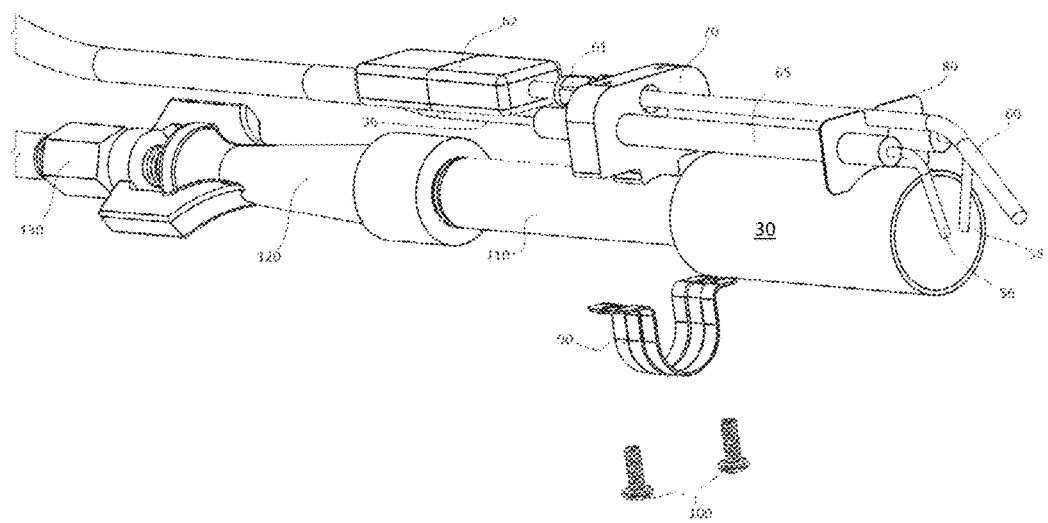
FIG. 6 is an exploded view of an embodiment of the direct spark igniter assembly of the present invention being mounted to the separator pilot burner assembly.
Figure 7:
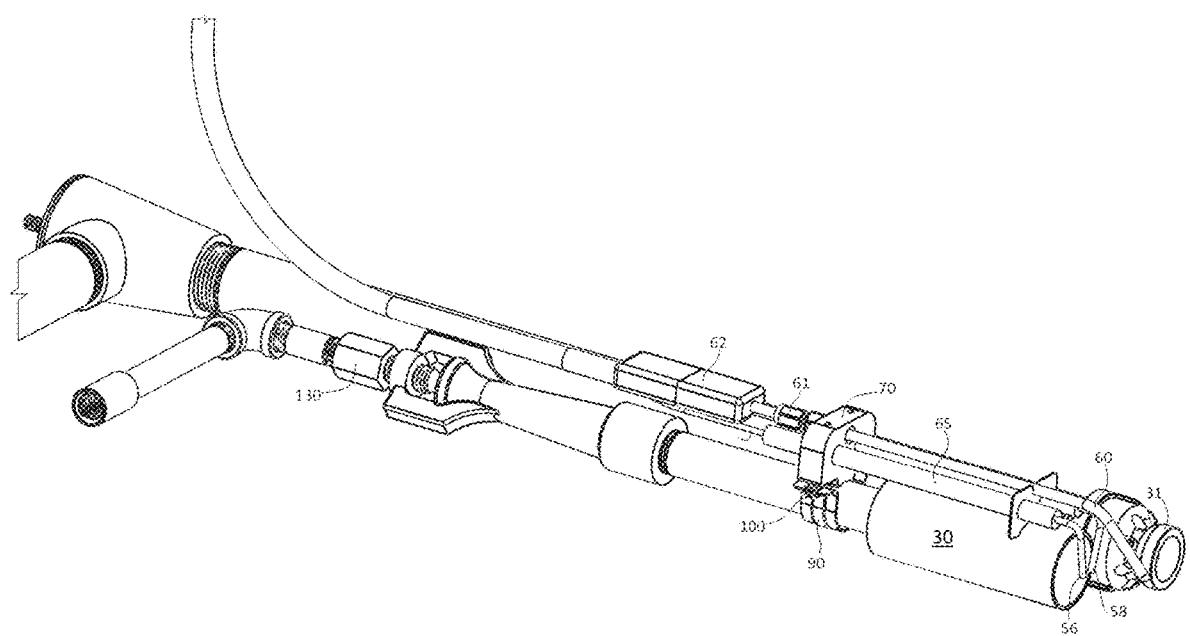
FIG. 7 is a perspective view of the embodiment of the direct spark igniter assembly mounted onto the pilot burner assembly in proximity to the main burner.
Figure 8:
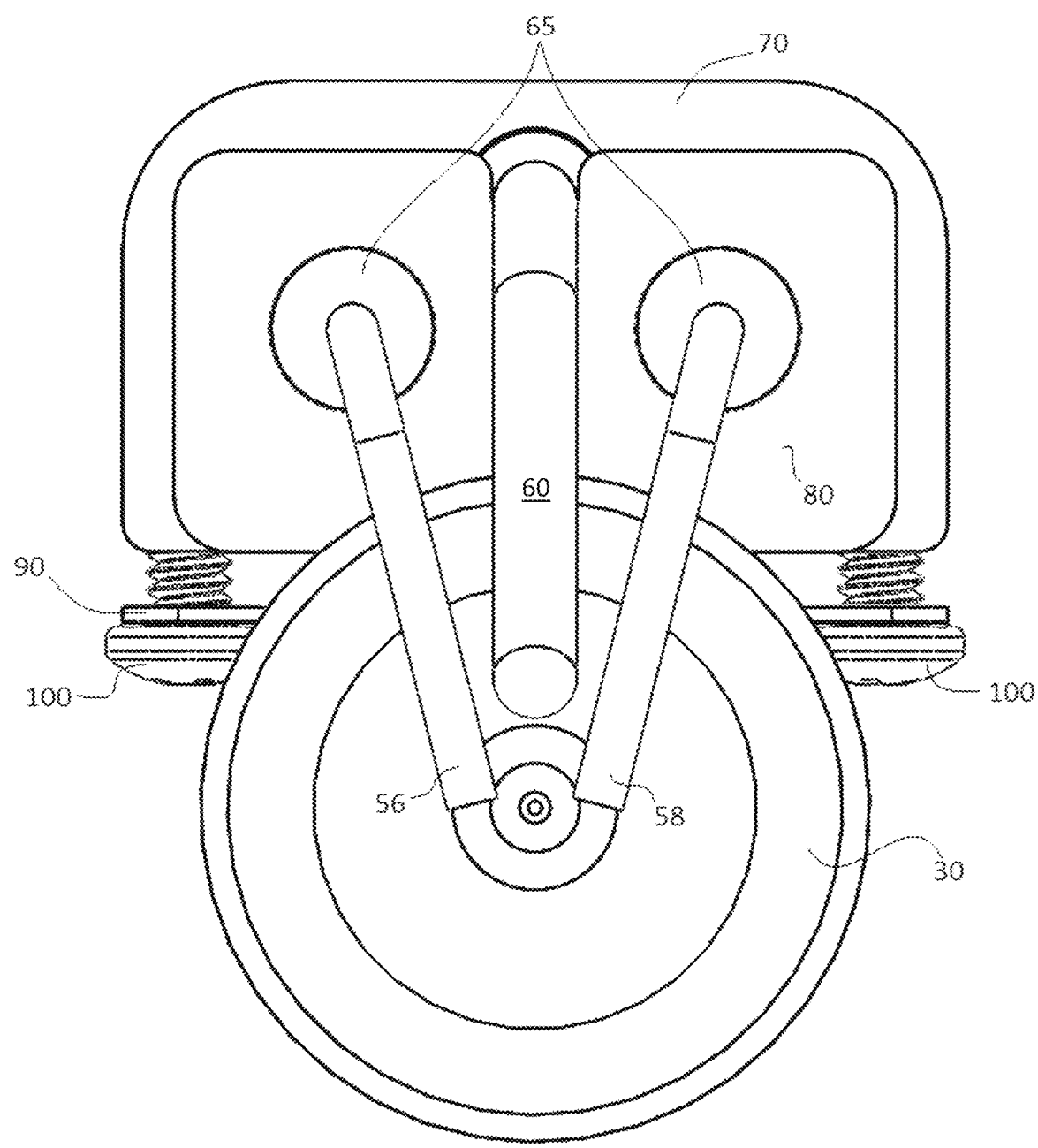
FIG. 8 is a front view of an embodiment of the direct spark igniter assembly mounted onto the pilot burner assembly.

Embodiments of the present invention comprise a direct spark ignitor assembly, depicted in FIGS. 6, 7 and 8. The direct spark ignitor assembly preferably comprises flame sensor 60 and ignition element 9, which preferably comprises electrodes 56, 58, and preferably provides alignment and mounting means therefor to pilot burner 30. Electrodes 56, 58 preferably protrude from ceramic electrode body 65 and are bent approximately 90 degrees toward the center of the nozzle opening of pilot burner 30. The electrodes are preferably configured so that the ignition arc arcs as closely across the center of the pilot burner 30 nozzle as possible, as shown in FIG. 8. In addition, the distance between the pilot burner 30 nozzle face and the tips of electrodes 56, 58 is preferably between about 1/8" and about 1/2" to achieve high ignition reliability. Electrodes 56, 58 are preferably held in clamp block 70, preferably within two circular holes slightly larger than the outer diameter of ceramic electrode body 65. Electrodes 56, 58 are preferably held in place by a pair of set screws that thread into clamp block 70 perpendicularly to electrode body 65. Electrodes 56, 58 are preferably pressed into and supported by secondary plate 80, which preferably comprises a radius cut into the bottom side to match the radius of the nozzle of pilot burner 30. Secondary plate 80 thus acts as a support to maintain the alignment of electrodes 56, 58 and as a brace to counter the cantilever characteristic of electrodes 56, 58 extruded from the clamp block 70. In addition, secondary plate 80 preferably comprises a small radius for flame sensor 60 to rest in.

Flame sensor 60 preferably comprises national pipe taper (NPT) to compression fitting 61 installed on the portion of the probe that runs parallel to the electrodes. The NPT portion of fitting 61 is preferably threaded into clamp block 70 and, once aligned correctly, the compression portion of fitting 61 is preferably tightened down onto a ferrule that holds flame sensor 60 fixed. This feature, coupled with flame sensor plug and receptacle 62, allows flame sensor 60 to be installed and/or replaced easily.

Installation of the direct spark ignitor assembly onto a separator burner system is intended to be a quick, zero-part deletion install. Clamp block 70 preferably comprises a radius on the bottom portion that matches the radius of burner nipple 110, which is typically threaded into and supports the nozzle of pilot burner 30. Clamp 90 attaches the clamp block 70 to burner nipple 110 via, for example, screws 100, enabling the direct spark igniter assembly to easily be attached to the existing pilot burner assembly. The preferable two-piece nature of the clamping mechanism of the direct spark ignitor makes installation a simple and quick, bolt-on procedure. The geometry of the bottom of clamp block 70 and clamp 90 work in conjunction with secondary plate 80 to ensure precise placement of electrodes 56, 58 and flame sensor 60. In addition, clamping clamp block 70 to burner nipple 110 provides a smaller mounting diameter, and ultimately lowers the vertical profile of the direct spark assembly to be closer to the pilot burner 30 assembly. Furthermore, by mounting the clamp block further back on the burner nipple, the relatively large thermal mass of the clamp block 70 is moved further back from the flames of both the main burner and pilot burner 30. This position of clamp block 70 and the convective cooling of air drafting to the burners keeps clamp block 70 cool and ultimately mitigates the exposure to heat of the insulation of high voltage wire 36, which enters the back ends of electrodes 56, 58 and the leads of flame sensor 60.

During operation a direct spark ignitor is preferably responsible for igniting and monitoring a pilot burner 30 flame. As in traditional control burner systems, fuel gas flows from orifice nipple 130 into mixture chamber 120 and exits the nozzle of pilot burner 30 as a correctly mixed fuel/air stream, ready for ignition. Without a flame present, flame sensor 60 will output a reading indicating the lack of flame to controller 19, which sends a high voltage, direct current pulse to electrodes 56, 58. The potential created by the high voltage pulse overcomes the gap between electrodes 56, 58 and causes a spark discharge across the gap. This spark discharge between the tips of electrodes 56, 58 ignites the gas stream passing through it. Once a flame is established, it is then recognized by flame sensor 60, which preferably lies directly in the path of the flame.

Flame sensor 60 preferably comprises a thermocouple probe. A thermocouple produces a small voltage proportional to the temperature that it is exposed to. Flame sensor 60 is preferably a thermocouple housed within a high-temperature alloy probe, which can be directly immersed in the flame of pilot burner 30. The placement of flame sensor 60 directly into the flame is much less affected by increases or decreases in convective cooling due to varying draft air velocities. This effect becomes especially important during the introduction and removal of the flame of main burner 31, as that has a dramatic effect on draft air velocities inside the separator burner housing 7.

Means of flame sensing other than using a thermocouple can be used either alone or in combination, including but not limited to ultraviolet light (UV) sensing, infrared (IR) light sensing, visible (VIS) light sensing and audio sensing. When sensing flames from pilot burner 30 with UV/IR/VIS sensors, the flame quality and burning fuel mixture is extremely important to the radiation wavelengths emitted from the flame. Lean fuel mixture flame radiation is on the emission spectrum in the range of UV wavelengths, while a rich fuel mixture flame emits radiation with wavelengths in the IR range, and VIS is produced in ranging intensities throughout. Being that flames from pilot burner 30 and main burner 31 vary widely in the oilfield due to changing weather conditions, varying fuel supplies, and the fact that both flames are not always adjusted by properly trained technicians, optical flame sensing is preferably performed using two or more of the previously mentioned optical flame sensors. Alternatively, flame sensing can be accomplished with audio by means of audio characteristics; this has the ability to sense unignited fuel flow, an ignited pilot burner flame, and an ignited main burner flame. These three conditions produce different audio characteristics. Unignited fuel flow is laminar and does not produce the audio characteristics produced by the turbulence produced by a burning flame, such as a high amplitude rumble. The sound waves produced by flames from pilot burner 30 and main burner 31 are differentiable by the amplitude of turbulence produced.

Figure 9:
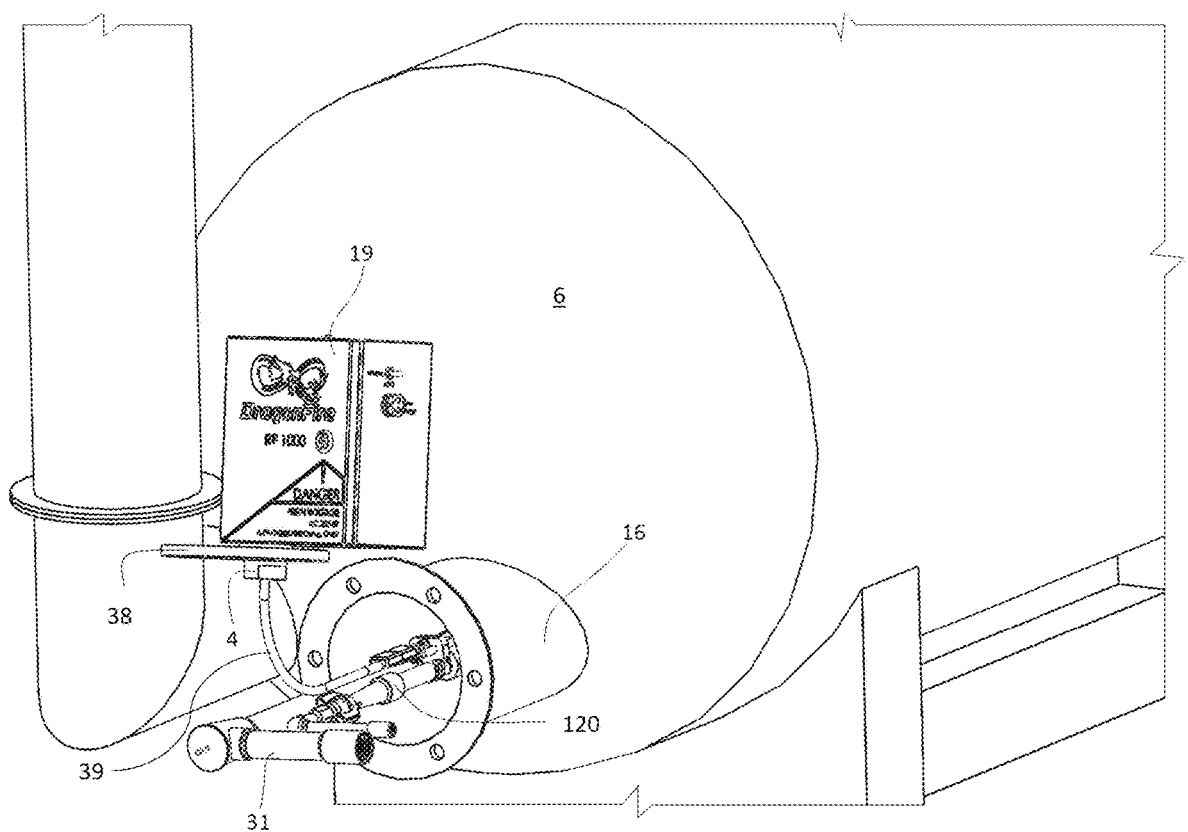
FIG. 9 is a perspective view of an embodiment of the present invention mounted on a separator with the burner housing removed.

The direct spark ignitor assembly described above is preferably directly connected to the controller 19 by means of wire harness 39, shown in FIGS. 9 (which figure does not show separator burner housing 7 for illustrative purposes), 10, and 11, and preferably comprises a fiberglass sleeve. When retrofitting or otherwise installing the direct spark ignitor assembly, a pair of high voltage wires and a pair of flames sensor wires must pass from controller 19, which is preferably disposed on the outside of the separator, into burner housing 7 by a method that preferably does not require cutting or welding to be done in the field and that retains the isolation of the burner system from the environment. The direct spark igniter assembly preferably operates with a closed loop high voltage supply, which improves the safety of the system. If the high voltage supply is grounded to the separator, as is the case with other BMS systems, the odds of a technician/operator being shocked due to improper grounding of the system are higher. In addition, an independently grounded high voltage loop has a lower likelihood of shorting anywhere on the lines running to the ignitor's arc gap. When grounded to the system, one single break in insulation can cause a short to the system, but when independently grounded the voltage must find a path of lower resistance out of one leg's insulation and through the insulation of the other leg, which is much less likely. Thus one of the wires to the direct spark ignitor assembly is preferably a high voltage wire comprising insulation suitable for high voltage, and the other is preferably a dedicated ground wire with high conductance. This two-wire approach for the spark ignitor is preferable to using the separator body as a ground plane, since voltage can temporarily build up on the separator body and cause a failure in the electronic controller.

Figure 1:
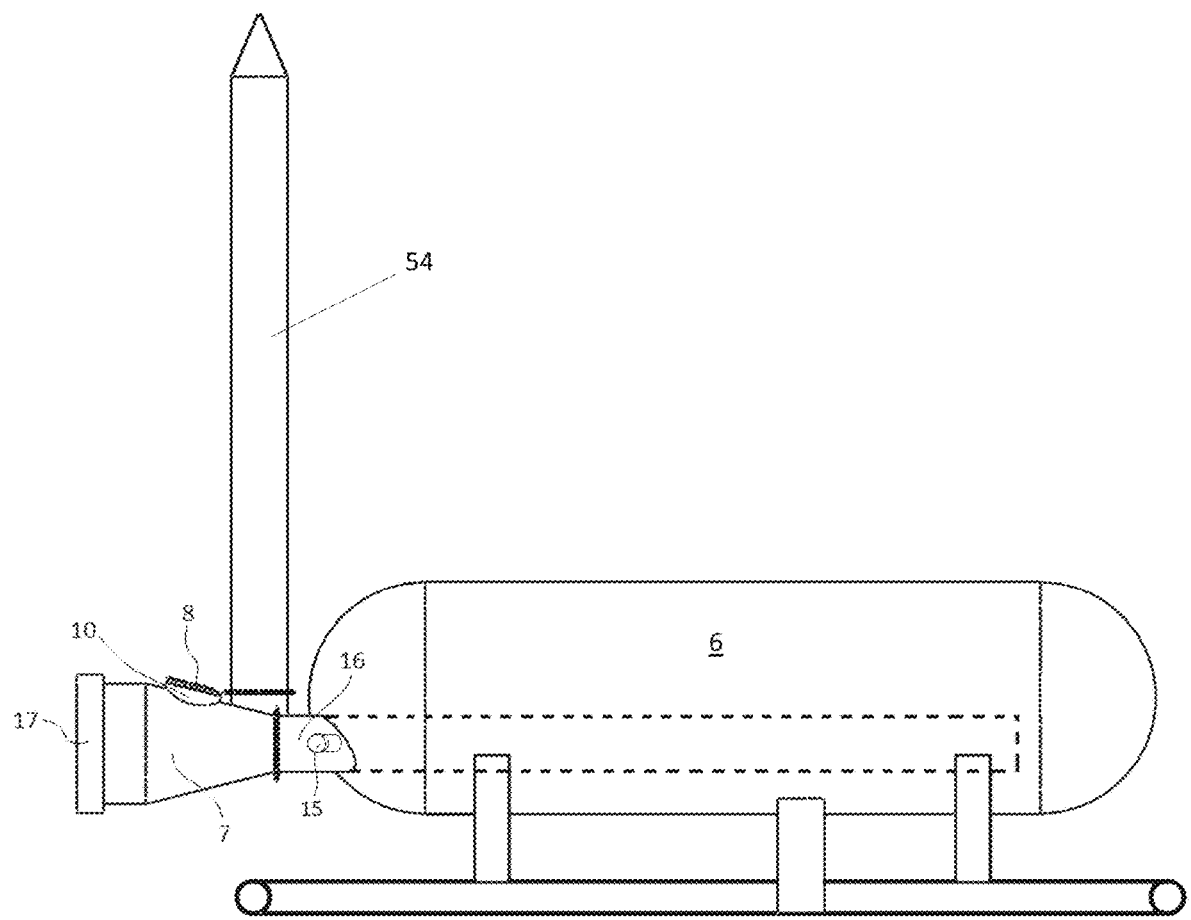
FIG. 1 is a schematic of a typical oilfield separator known in the art.
Figure 2:
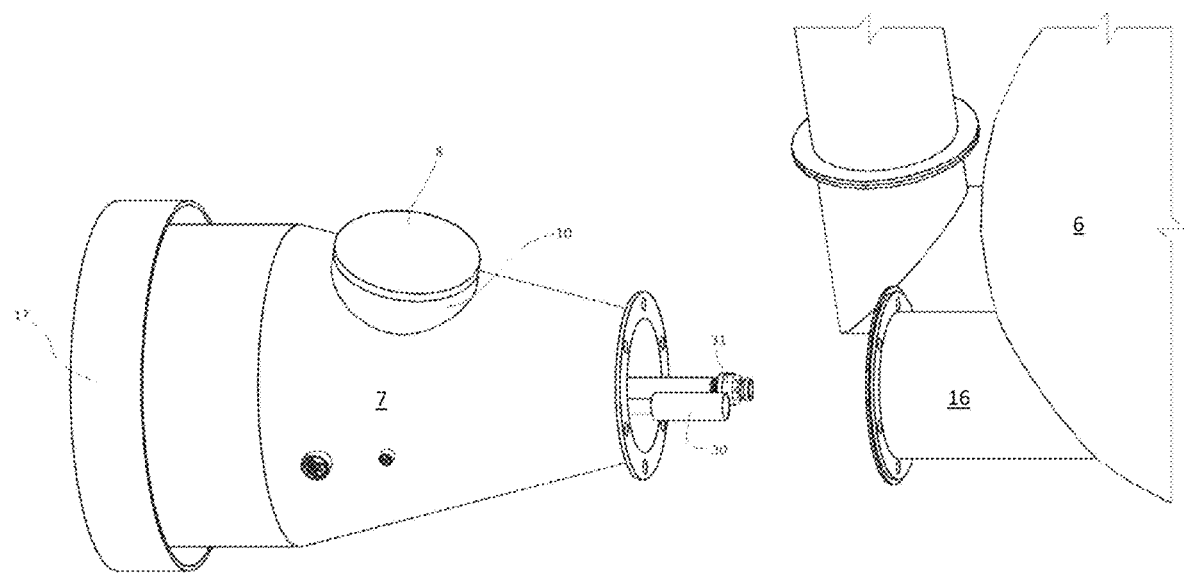
FIG. 2 is a detail of the burner housing of FIG. 1.
Figure 3:
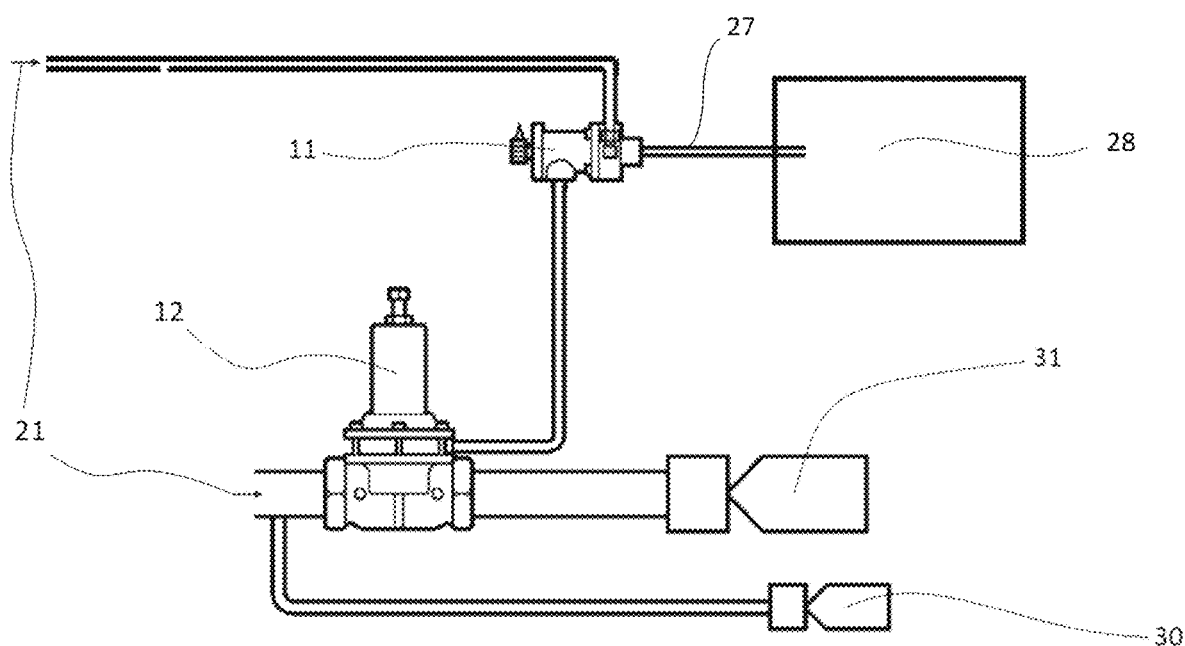
FIG. 3 is a schematic of a traditionally arranged separator burner control system.
Figure 4:
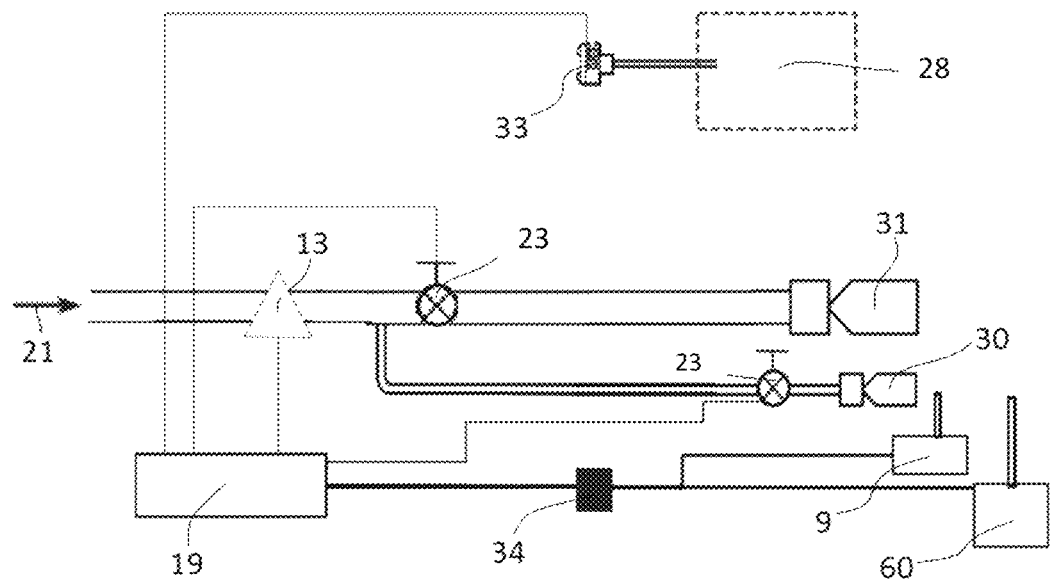
FIG. 4 is a schematic of an example of a typical existing burner management system.
Figure 5:
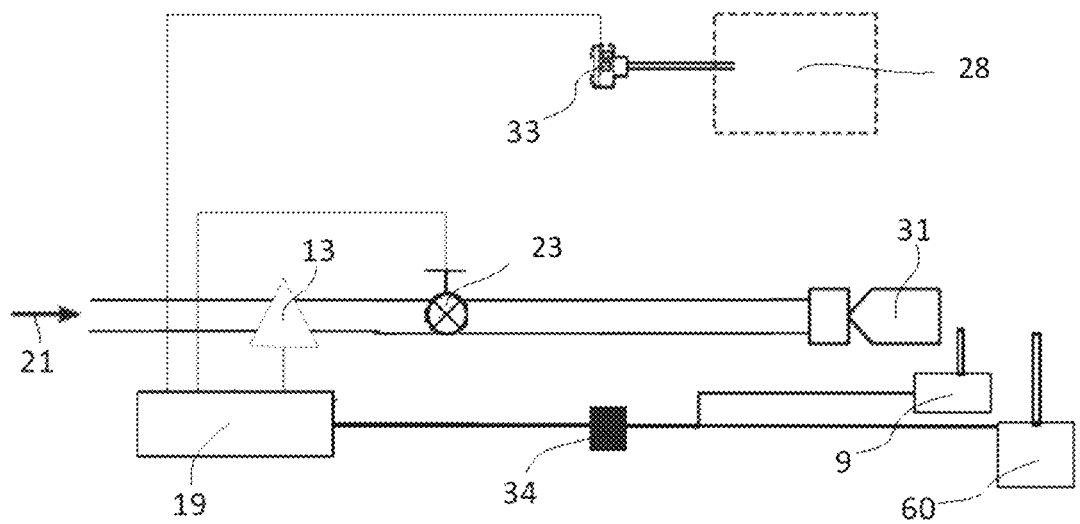
FIG. 5 is a schematic of another example of a typical existing burner management system without a pilot burner assembly.
Figure 10:
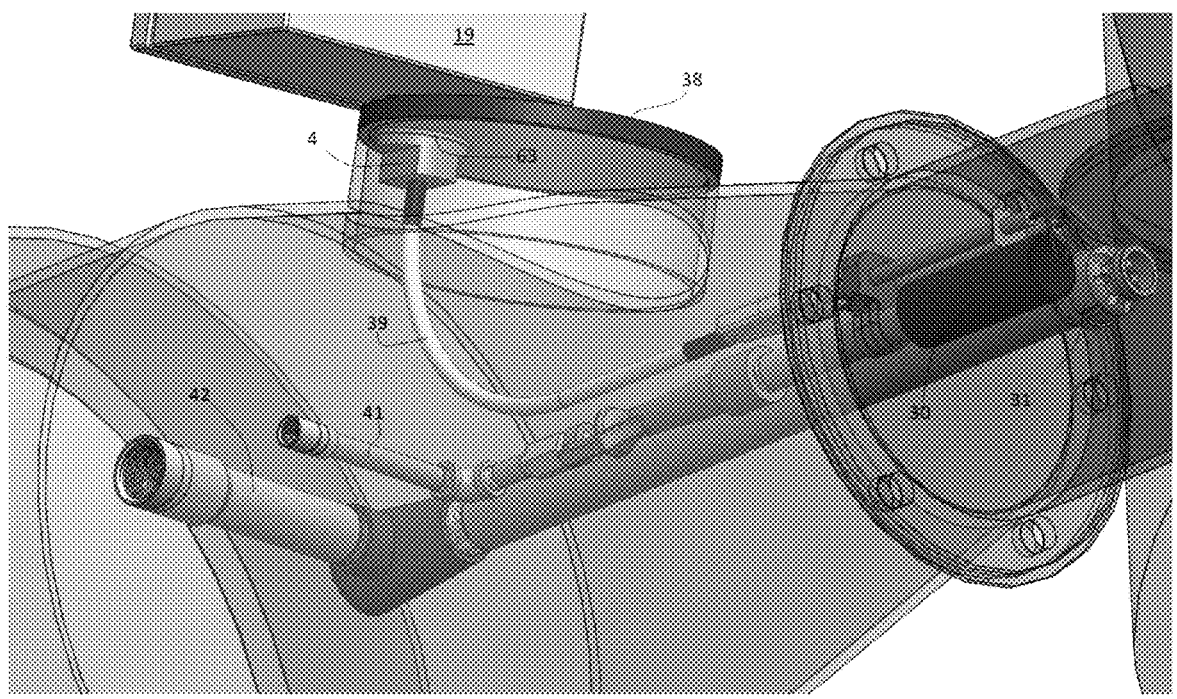
FIG. 10 is a cutaway view of the modified burner housing access port plate and direct spark igniter assembly of the present invention.
Figure 11:
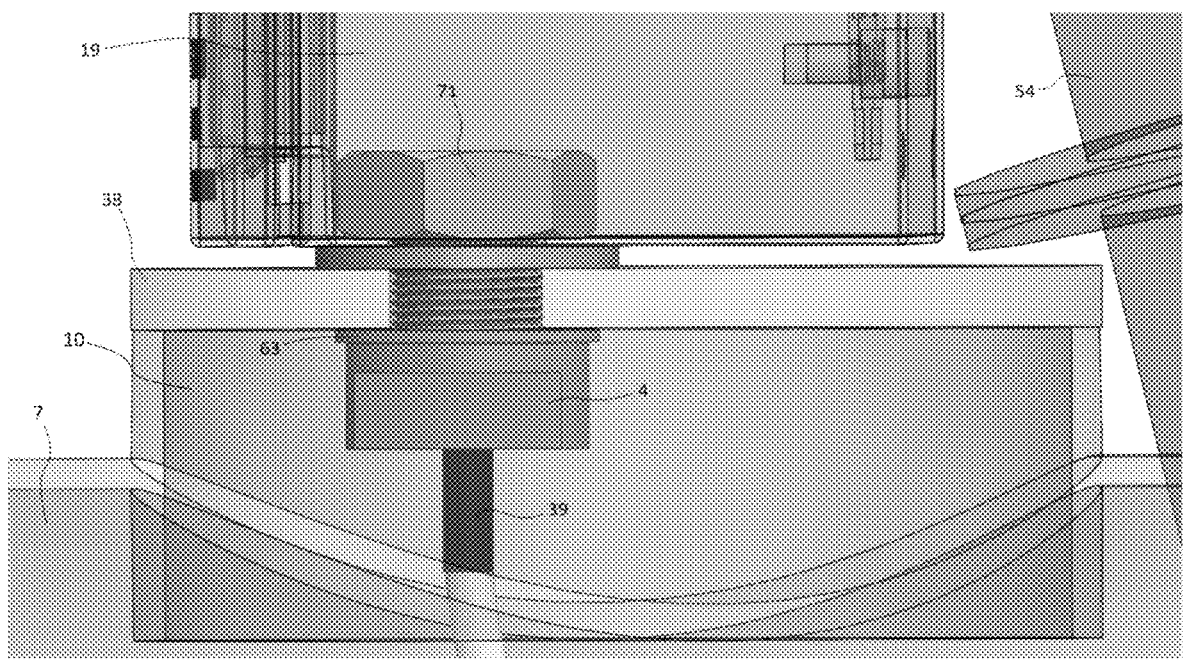
FIG. 11 is a cutaway view showing the attachment of the controller box to the modified burner housing access port plate and electrical feedthrough of the present invention.

Most oilfield separators are equipped with burner housing access port 10 and burner housing access port plate 8 (shown in FIGS. 1 and 2). The present invention preferably comprises modified burner housing access port cover or plate 38, as shown in FIGS. 9, 10, and 11, comprising a mounting interface for controller 19, that replaces the existing or stock burner housing access port plate 8. The present invention can be thus installed on a separator without cutting or welding on any permanent equipment.

Modified burner housing access port plate 38 preferably matches the dimensions of the stock burner housing access port plate 8, but includes a hole for feedthrough 4 to pass through. Feedthrough 4, shown in FIG. 12, preferably comprises a cylindrical, corrosion resistant alloy with a portion of reduced diameter that is threaded. Shoulder 1 results from reducing the diameter of the cylindrical alloy before cutting threads 5. Feedthrough 4 provides passage 3 for wire harness 39 and also preferably fastens controller 19 to modified burner housing access port plate 38. The hollow nature of feedthrough 4 allows the passage of wires from controller 19 through the hole in modified burner housing access port plate 38, and finally to the direct spark ignitor assembly. After the wires are passed through feedthrough 4, passage 3 is preferably filled with an epoxy or similar fluid that is rigid when cured and acts as tension relief on the cabling. In addition, once cured, the passage 3 becomes solid and does not allow environmental communication between the inside of controller 19 and the inside of separator burner housing 7.

Figure 12:
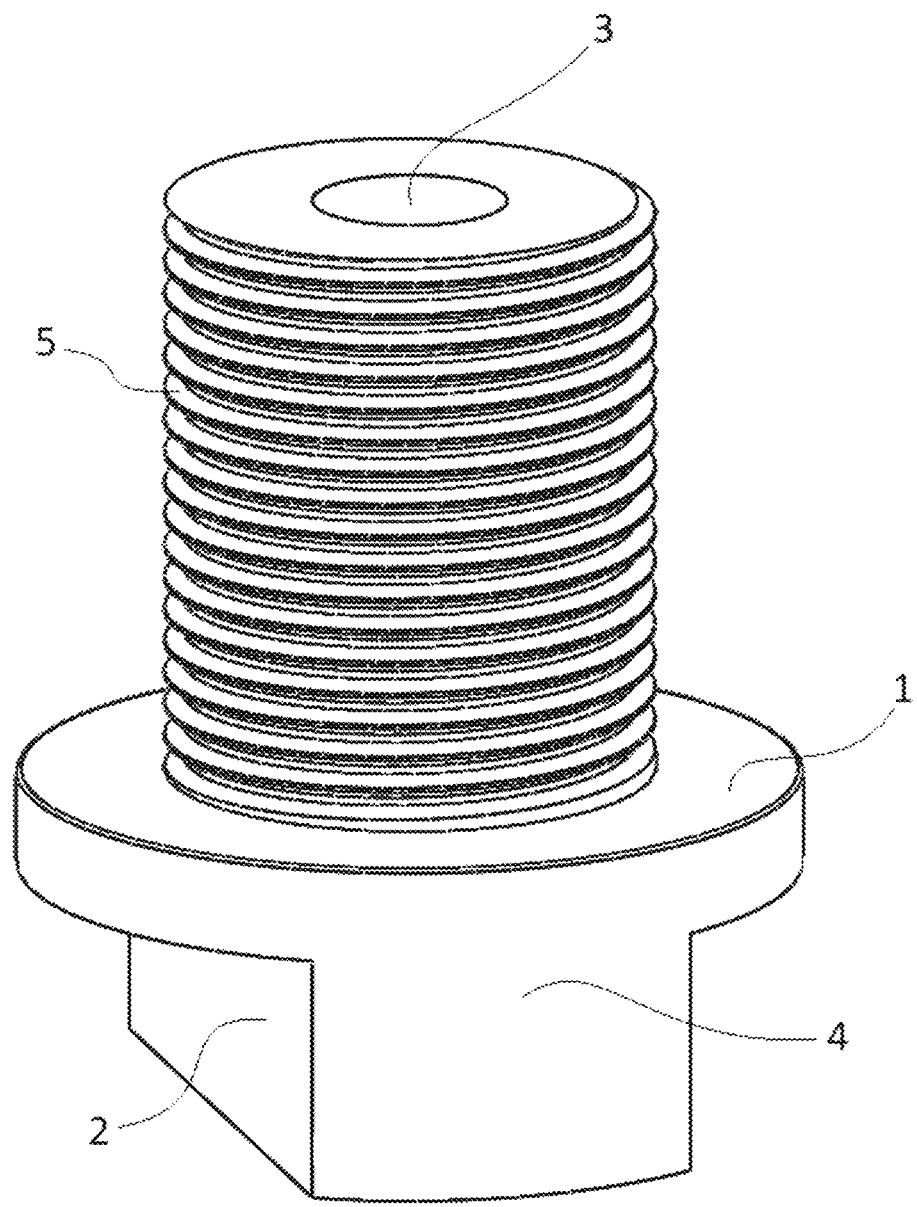
FIG. 12 is a depiction of the electrical feedthrough of the present invention.
Figure 13A:
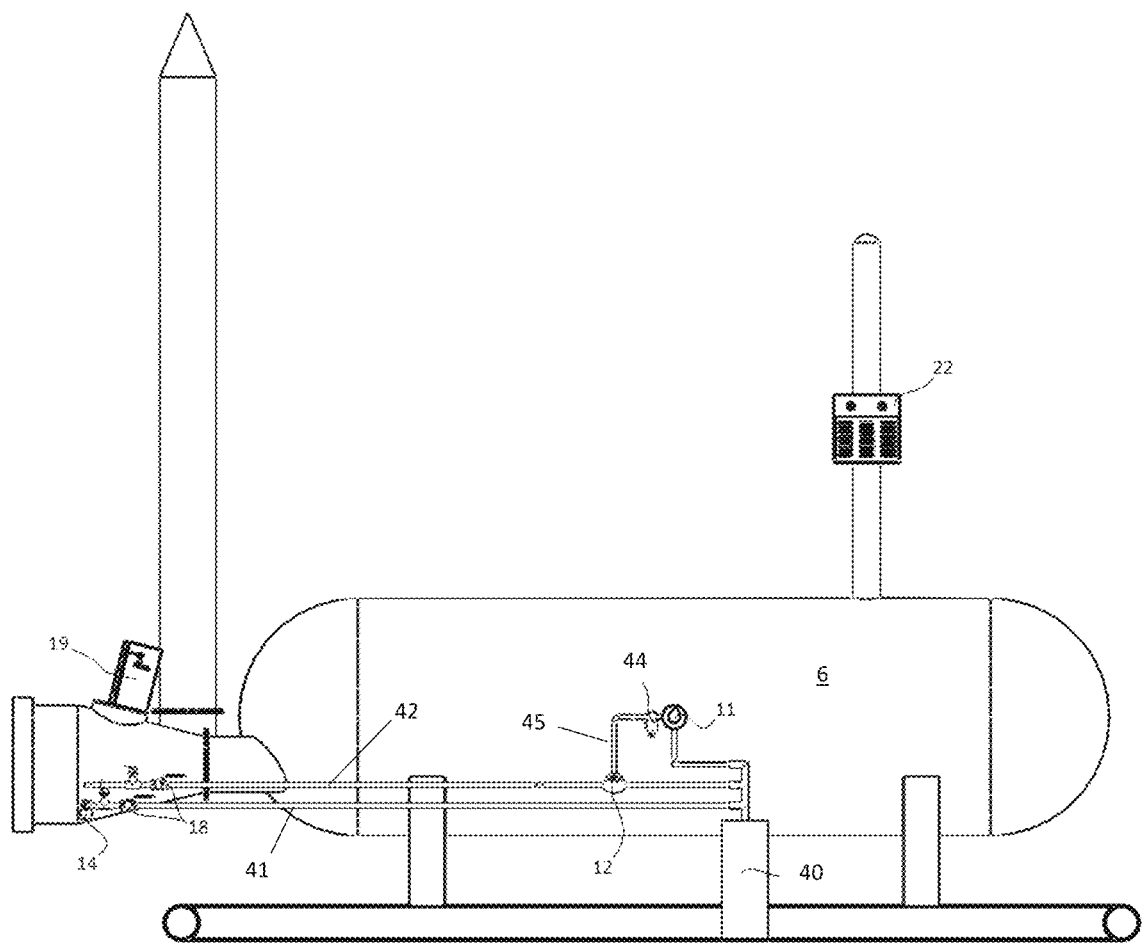
FIG. 13A shows a first configuration of the present invention comprising pressure sensors.
Figure 13B:
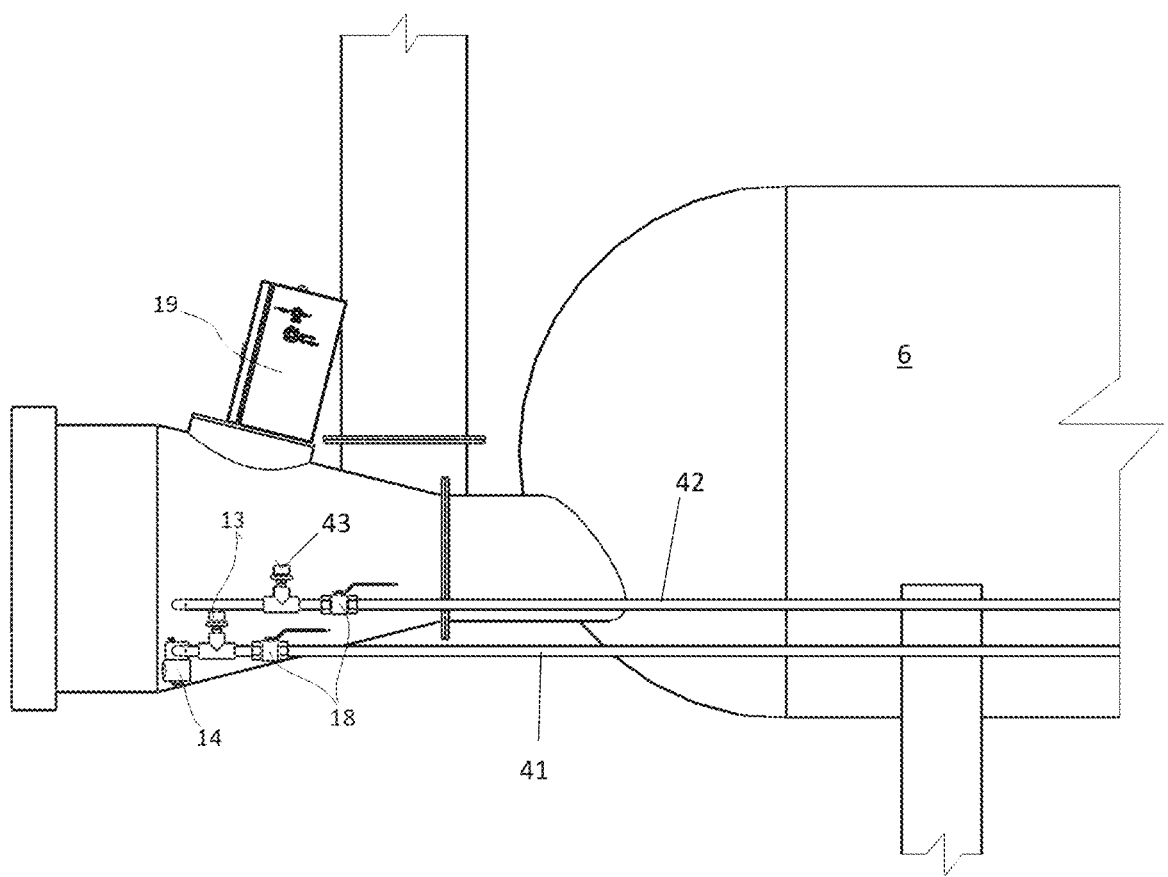
FIG. 13B shows a detailed view of the components of FIG. 13A near the burner housing.
Figure 13C:
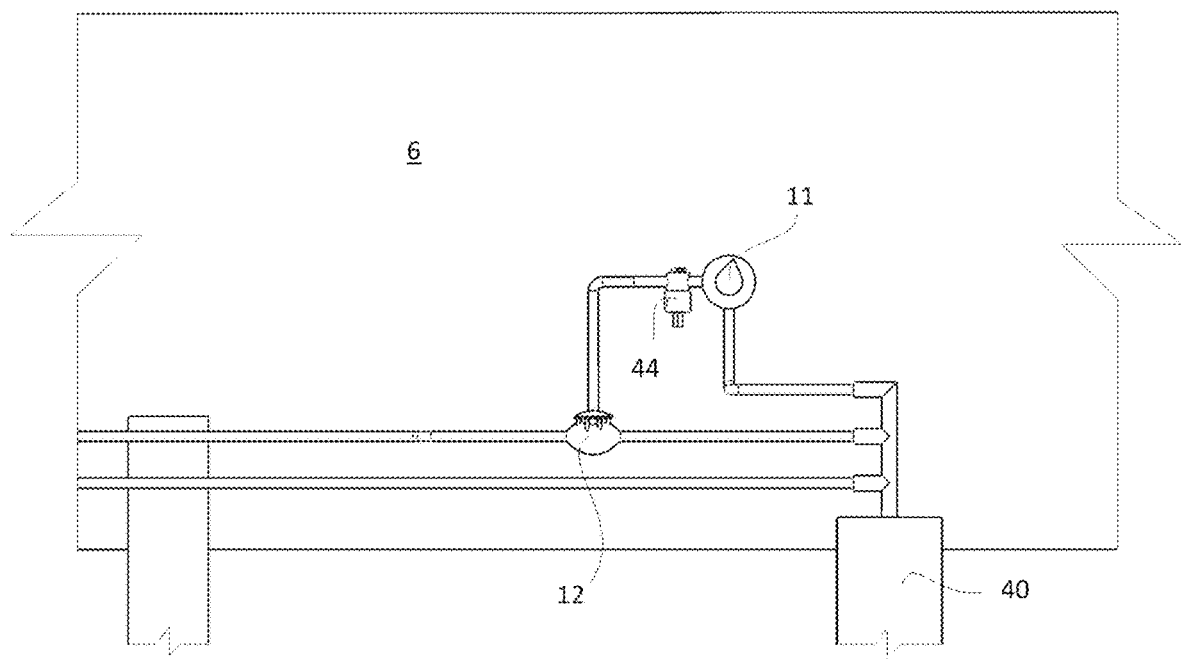
FIG. 13C shows a detailed view of the components of FIG. 13A near the pneumatic thermostat.

As shown in FIGS. 10-12, feedthrough 4 is preferably configured to be inserted with the thread portion up, into the bottom and through the designated hole of modified burner housing access port plate 38. Threads 5 then protrude out the top of modified burner housing access port plate 38 and into a similar sized hole in the bottom of controller 19. Nut 71 is then fastened onto threads 5 inside controller 19 and tightened to secure controller 19 onto modified burner housing access port plate 38. Feedthrough 4 is preferably installable by conventional tools, such as an adjustable wrench, acting on tooling surface 2. Any alternative method of fastening controller 19 to feedthrough 4 may be used. The hole in modified burner housing access port plate 38 should be larger than the diameter of threads 5 but smaller than the diameter of shoulder 1. In this way, feedthrough 4 will not fit past the hole in modified burner housing access port plate 38, enabling the fastening of the controller 19. In addition, an O-ring, gasket or any other type of compressible material 63 can be placed on shoulder 1, thus sealing the connection between the bottom of modified burner housing access port plate 38 and feedthrough 4. This seal is protected from the elements and from UV degradation since it is on the inside of separator burner housing 7. Modified burner housing access port plate 38 is easily mounted to separator burner housing 7 by original means, most commonly a cam lever pressing modified burner housing access port plate 38 onto separator burner housing 7. A gasket material is preferably disposed between modified burner housing access port plate 38 and separator burner housing 7 and is compressed by the installation of modified burner housing access port plate 38, resulting in a sealed connection.

An embodiment of the control component configuration of the present invention is shown in FIG. 13A, FIG. 13B, FIG. 13C, and FIG. 14. Small tubing lines connected to gas source 40, referred to as fuel lines, supply lines, or control lines, are typically disposed on the outside of separator burner housing 7; one is pilot burner supply line 41, another is main burner line supply line 42, and another is temperature control supply line 45. On pilot burner supply line 41 and main burner line supply line 42 manual valves 18 are typically installed for manual control of the burners. Downstream of manual valve 18 on the pilot burner fuel line, in-line pressure sensor 13, preferably of the pressure switch variety, is installed. Further downstream, and closest to separator burner housing 7, electronic valve 14, preferably of the latching solenoid variety (to reduce power consumption), non-venting and bypassable, is installed. Electronic valve 44 is located downstream of pneumatic thermostat 11 on temperature control supply line 45 before pressure open valve 12, which is connected to main burner supply line 42. Electronic valve 44 is preferably of the latching solenoid variety (to reduce power consumption), three-way venting type and bypassable.

This embodiment intervenes only if a pilot burner 30 flame loss occurs, otherwise the separator is left to similar means of traditional control. Pneumatic thermostat 11 is solely responsible for vessel temperature control. During initial start-up controller 19 is preferably set to "Auto" via a mode selector, both manual valves 18 are open, and electronic valves 14, 44 are open as well. In "Auto" mode, controller 19 detects fuel pressure at pressure sensor 13 on pilot burner supply line 41, and if gas is present, opens electronic valve 14. If controller 19 detects fuel pressure from optional pressure sensor 43 on main burner supply line 42, the system will not stage ignition, since attempting to ignite pilot burner 30 with fuel flow present at main burner 31 may cause a backfire. If fuel pressure is present at pilot burner 30 and fuel pressure is not present at main burner 31, controller 19 delays for a pre-determined amount of time allowing fuel gas to prime pilot burner 30. After the priming delay, controller 19 ignites the pilot burner gas stream preferably by means of a high voltage pulse sent to the direct spark ignitor, causing a spark discharge, as described above. Once the pilot burner gas stream is ignited, the flame is sensed by flame sensor 60 of the direct spark ignitor assembly. In a two temperature-threshold protocol, controller 19 ceases ignition attempts as soon as the first threshold is crossed, and when the second threshold is crossed, controller 19 opens electronic valve 44 between pneumatic thermostat 11 and pressure open valve 12. The two temperature-threshold protocol limits unnecessary ignition attempts with the first, lower threshold, and allows pilot burner 30 to stabilize before possibly igniting main burner 31. At this point, all fuel supply lines and the control line to the pressure open valve 12 are open and the separator can now operate as originally designed.

If controller 19, via flame sensor 60, detects a lost pilot burner flame, controller 19 preferably closes electronic valves 14 and 44. Electronic valve 44, once closed, will cease gas flow to main burner 31 and preferably vents the gas pressure between pneumatic thermostat 11 and pressure open valve 12. Once gas flow to both pilot burner 30 and the main burner 31 is stopped, controller 19 preferably delays for a pre-determined amount of time to allow any unignited fuel gas that was emitted during the cooling or sensing period of the flame sensor to dissipate. Once this delay is over, controller 19 repeats the process described above, beginning with the priming delay. The only difference between re-ignition and initial ignition is that re-ignition preferably does not repeat the two temperature-threshold protocol, since flame sensor 60 is already warmed up.

Utilizing electronic valve 14 becomes especially useful when a flame has not been present for a considerable amount of time due to fuel freeze-offs or a shut-in burner system. If fuel is provided uncontrolled to pilot burner 30 and a draft is not established, for example due to a cold fire tube 16, flooding can become an issue. If ignition is not achieved within a pre-determined number of attempts, fuel flow to pilot burner 30 is stopped and, after delaying long enough for flooding to disperse from fire tube 16, ignition can be reattempted. Ignition reliability is increased tremendously with the use of electronic valve 14 for precise priming delays and flood dispersion protocols. In addition, electronic valve 14 and electronic valve 44 used in conjunction with one another can stop all un-burnt fuel emission if ignition cannot be achieved.

This embodiment of the present invention enables traditional control of the separator burner system without the risk of flame loss or the venting of gas typical of existing systems. In addition, this embodiment will not waste energy on unnecessary ignition attempts if sufficient fuel pressure is not present. Furthermore, if manual valve 18 in pilot burner supply line 41 is erroneously left shut, or if the fuel supply becomes frozen, controller 19 will recognize this, keep both electronic valves 14 and 44 shut to prevent gas emissions, and wait in a power saving mode until fuel pressure returns to the pilot burner supply line 41.

Figure 15:
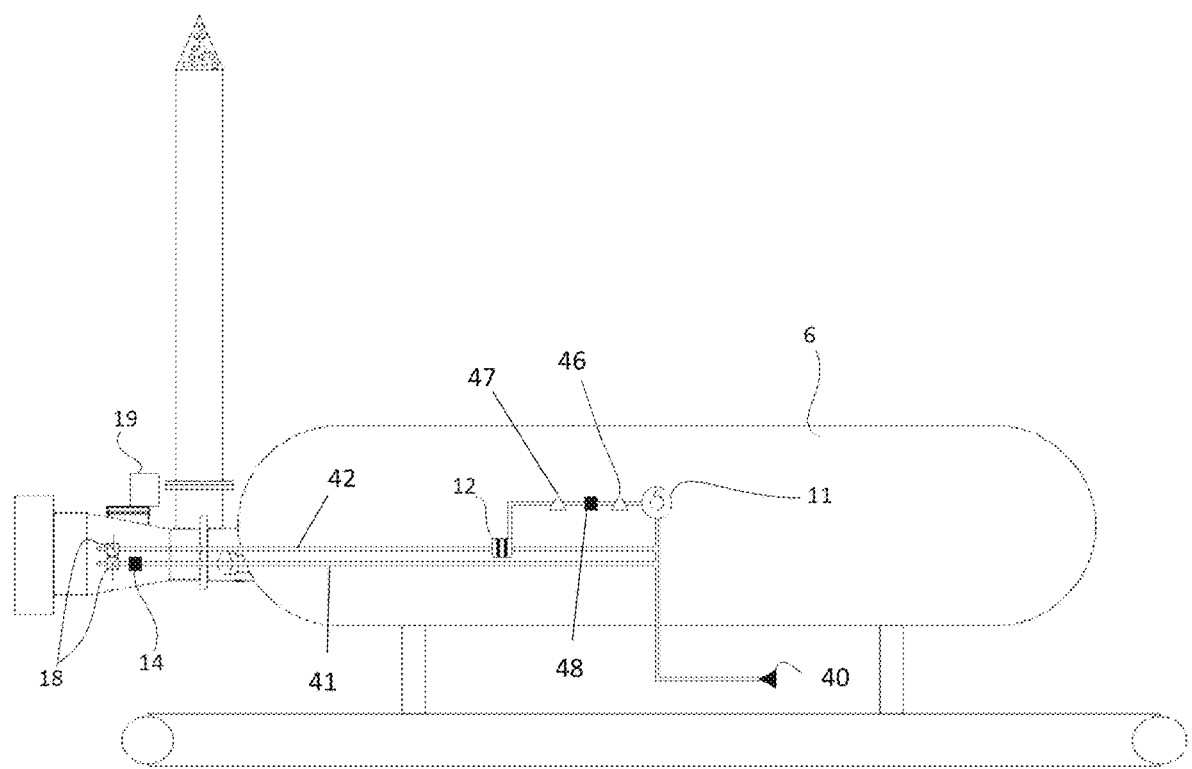
FIG. 15 shows a second configuration of the present invention comprising pressure sensors.

Another embodiment of the present invention is shown in FIG. 15. This configuration follows the same protocols as the first as far as initial ignition and re-ignition. However, this embodiment is intended to handle issues that arise from separators having low or inconsistent fluid input, or separators with oversized burner assemblies. In addition, this embodiment addresses customer concerns of unnecessary fuel consumption caused by constant pilot operation and unnecessary fuel combustion emissions. In this embodiment, electronic valve 48, preferably of the latching solenoid variety, three-way venting type and bypassable, is installed on the control line between pneumatic thermostat 11 and pressure open valve 12. Pressure sensors 46, 47, preferably of the pressure switch variety and thus preferably wired in parallel, are installed upstream and downstream of electronic valve 48. Alternatively, pressure sensors 46, 47 can be installed downstream of manual valves 18 on either or both of pilot burner supply line 41 and main burner supply line 42 to avoid backfires and detect pilot fuel pressure presence. Electronic valve 14, preferably of the latching solenoid variety, non-venting and bypassable, is installed either before or after manual valve 18 on pilot burner supply line 41.

Pneumatic thermostat 11, the type most typically seen in the oilfield, throttles the main burner on and off. This fact is especially important when the separator is under traditional control (i.e. no electronics are being used) and it is undesirable for main burner 31 to snap off or snap on, since rapid actuation of main burner 31 increases the odds of extinguishing the flame of pilot burner 30. In order to throttle main burner 31 on and off, pneumatic thermostat 11 outputs a pressure proportional to the differential between a vessel temperature lower than the set temperature of the pneumatic thermostat 11. This proportional pressure range is typically only present when the vessel temperature is just a few degrees lower than the set temperature on the pneumatic thermostat 11 (typically within about 10 degrees). This characteristic will demonstrate the necessity of the two parallel pressure sensors 46, 47. Pressure sensor 46 is installed upstream of electronic valve 48 and downstream of pneumatic thermostat 11. Pressure sensor 46 is preferably set to a higher actuation pressure than pressure sensor 47 but lower than the maximum output pressure of pneumatic thermostat 11. Pressure sensor 47 is installed downstream of electronic valve 48 and upstream of pressure open valve 12. Controller 19, equipped with a different algorithm than the first embodiment, keeps both electronic valves 14 shut when there is no signal of pressure coming from pressure sensors 46, 47 which signifies that no flame is present. When the temperature of separator vessel 6 drops low enough that the output pressure of pneumatic thermostat 11 becomes higher than the actuation pressure of pressure sensor 46, a signal is created by the pressure sensor 46 and the controller initiates ignition of the pilot burner flame. Controller 19 ignites the pilot burner flame through the protocol previously described in the above embodiment. Once the pilot burner flame is established and the second temperature threshold on flame sensor 60 output is crossed, electronic valve 48 is opened, and consequently main burner 31 is supplied with fuel gas. The output pressure of pneumatic thermostat 11 is now available to both pressure sensors 46, 47. The temperature of separator vessel 6 begins to increase and the output pressure of pneumatic thermostat 11 decreases. The separator vessel temperature increases to the point that the output pressure of pneumatic thermostat 11 will soon drop below the actuation pressure of pressure sensor 46 but above the actuation pressure of pressure sensor 47. The vessel temperature will increase for a temperature differential proportional to the pressure differential of the two pressure sensors 13. Once pneumatic thermostat 11 is satisfied to the point that its output pressure is reduced below the actuation pressure of pressure sensor 47, controller 19 loses the pressure signal and closes electronic valves 14, 48, extinguishing both the pilot burner flame and the main burner flame. The separator fluids must cool to a point that the output pressure of pneumatic thermostat 11 re-actuates pressure sensor 46 before the burner cycle restarts. In this method, the burner cycle is initiated and performed over a temperature differential determined by the differential of the actuation pressures of pressure sensor 46, 47. If only pressure sensor 46 were used, controller 19 would perform a much larger number of cycles per day and the cyclical lifetime of the system would be reached much sooner.

The control system described above could be achieved using a single pressure transducer in the place of pressure sensor 46. Unlike pressure sensors, which are either on or off, a pressure transducer can output voltages proportional to the sensed pressure. The system would stage for a cycle, as described above when pressure sensor 46 is triggered, i.e. once the higher of two thresholds is seen at pressure transducer pressure sensor 46. The burner cycle would continue until the voltage caused by the pressure supplied by pneumatic thermostat 11 drops beneath the lower of two thresholds. The temperature differential created by the two thresholds, once again, acts in limiting the amount of cycles seen per day.

This embodiment can achieve total burner system shut down when pneumatic thermostat 11 is satisfied and reserve the method of bypass to traditional control. In addition, this present invention embodiment can equip the separator in such a way that the temperature of separator vessel 6 can be set at any time, and the need for initializing the system is removed. For example, the separator vessel temperature can be set via pneumatic thermostat 11 at a time where ambient temperatures are enough to hold the vessel temperature at or above the set point of pneumatic thermostat 11 and, in this scenario, at no point will flame be introduced to the separator. When ambient temperatures fall, for example in the fall or winter, so too will the vessel temperature, and controller 19 will recognize the output pressure from the pneumatic thermostat 11 and initiate the burner protocol described above. The controller algorithm will, preferably, be put into a lower power consuming sleep state during periods when there is no signal from a pressure sensor. Furthermore, similar to the previous embodiment, this embodiment of the present invention is equipped with a flame loss protocol in the operating algorithm, and in such instances responds just as the previous embodiment does.

Both embodiments are preferably installed through a modified burner housing access port plate 8 and are equipped with bypassable electronic valves. In both cases burner tube access port 15 is left unobstructed and zero parts are eliminated or left unusable. The electronic valves utilized in this system preferably have a manual override that holds the plunger off seat of an orifice to allow flow through the valve without an open electrical signal present. This built-in bypass, coupled with the pneumatic thermostat temperature control system of the existing separator, allows the operator of the process equipment to return to the traditional manual lighting process if required, for example by the failure of any electronics component. This traditional operation gives the operator the ability to restore heat in the process vessel if the present invention malfunctions. If controller 19, the direct spark assembly, and/or any control component becomes inoperable, the separator can thus be reverted to traditional control without special training or specialized tools.

Figure 16:
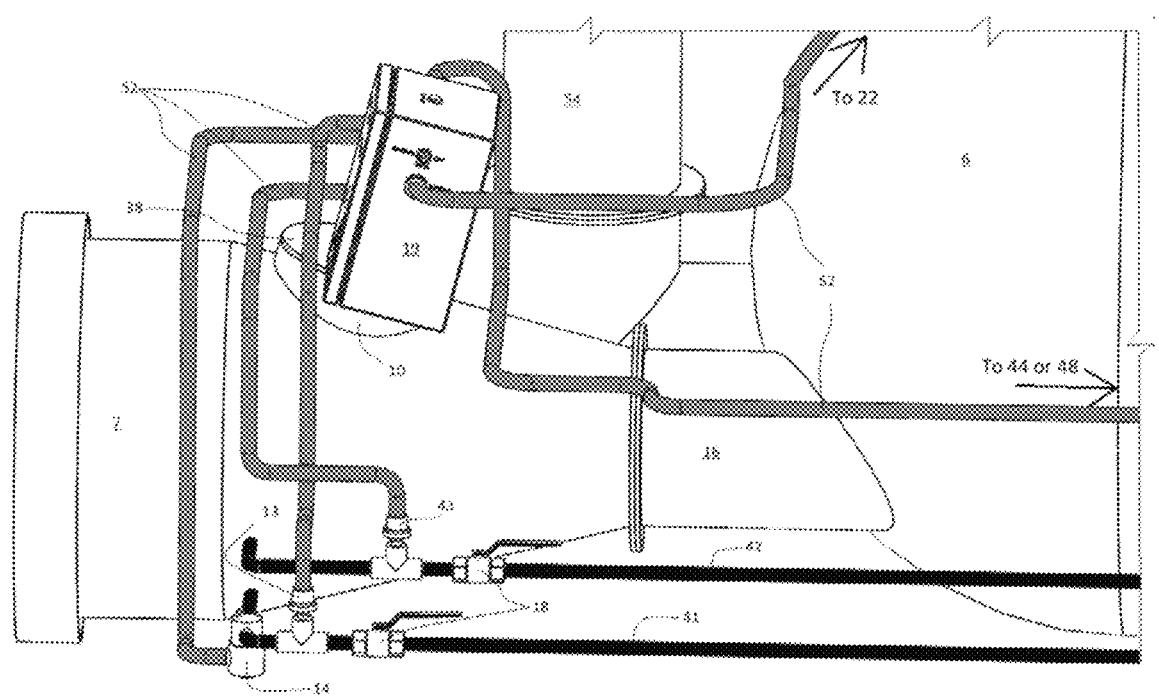
FIG. 16 shows flexible conduits connecting the electronic components of the present invention.

In both embodiments, the leads to the electronic valves, pressure sensors, and solar panel 22 are preferably encased in liquid-tight flexible conduit 52 connected to controller 19, as shown in FIG. 16. Utilizing this type of conduit is especially useful for installation of the invention, as installation footprints vary widely with the variety of makes and models of separators present in the oilfield. Employing this type of conduit and liquid tight fittings allows all outside wiring to have liquid-tight mechanical protection without the time-consuming burden of installing rigid conduit.

Figure 14:
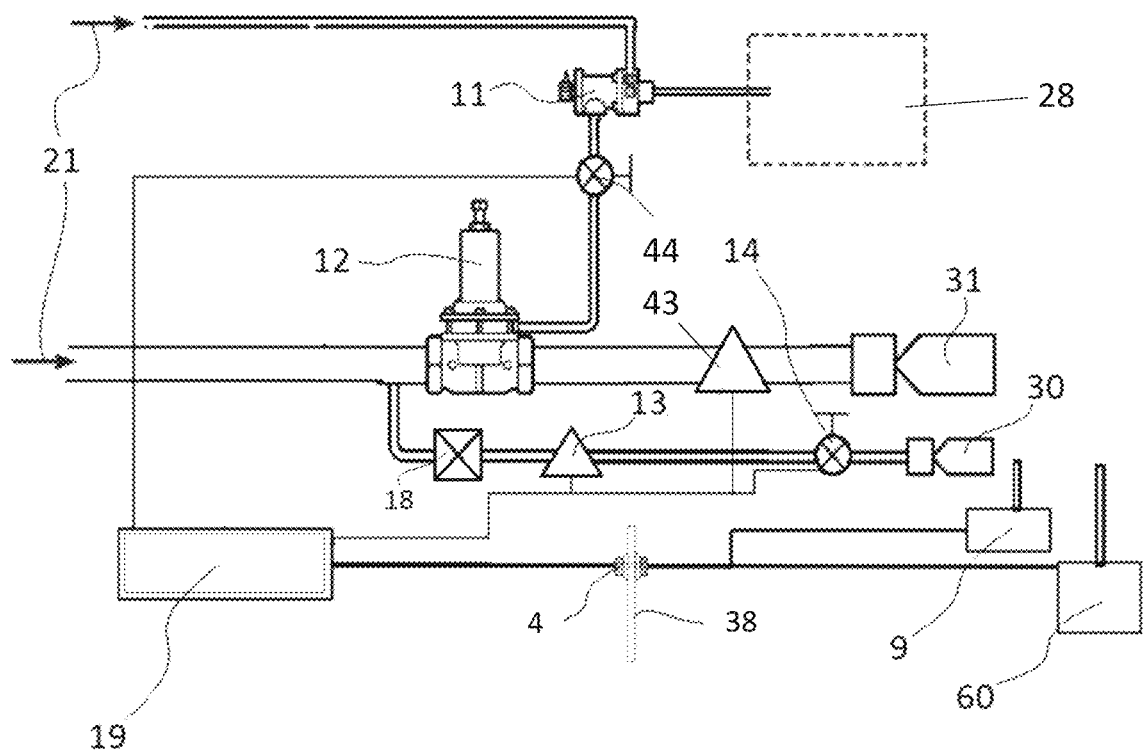
FIG. 14 is a schematic of the configuration of FIG. 13A.

In both embodiments, including the embodiment of FIG. 15 when equipped with an optional pressure sensor on main burner supply line 42 in a similar location to that of pressure sensor 43 of the embodiment of FIG. 14, a valve cycling protocol for electronic valve 44 or 48, which is responsible for the main burner fuel supply, will preferably be followed if a backfire prevention fault is present. A backfire prevention fault occurs when re-ignition of pilot burner 30 is necessary but fuel pressure is detected on the main burner supply line. This fuel pressure presence can be due to a failure in the existing pneumatic components, but is most commonly due to residue accumulation on the plunger of the electronic valve 44 or 48. This accumulation can interfere with the seal between the plunger and the orifice of the electronic valve 14 and cause pressure to bleed by, even in a shut position. A simple resolution to this is can be cycling the valve open and then back to close, agitating the accumulation and helping to seal the orifice. The present invention will preferably follow this protocol, checking the fuel pressure presence each time until fuel is shut-off to main burner 31 or a cycle limit is reached.

In both embodiments, the controller can be set to an idle mode without direct communication to the controller. Because pressure sensor 13 on pilot burner supply line 41 is preferably installed downstream of manual valve 18, the position of the manual valve can be indicated by the status of the pressure sensor. If manual valve 18 is open and no fuel freezes are present, pressure sensor 13 will indicate a positive pressure to the controller. If manual valve 18 is closed (or a fuel freeze exists), zero pressure would be indicated. The controller can be set to an idle mode (i.e. zero action status), when fuel pressure is not present at pressure sensor 13. Consequently, in the event the operator wants to shut down the control system of the present invention, the technician can simply close manual valve 18 on pilot burner supply line 41, an optionally manual valve 18 on main burner supply line 42, and the system preferably enters the idle mode. Once fire is required again, opening manual valve 18 on pilot burner supply line 41 preferably automatically changes the controller status from idle to auto for ignition.

Controller 19 preferably comprises a printed circuit board and a battery in electrical communication with the printed circuit board. The battery is preferably periodically rechargeable using one or more recharging means, such as solar panel 22. If the battery has less than a pre-determined threshold of energy remaining, controller 19 preferably sends a signal to the oilfield worker that the automated pilot ignitor system needs maintenance. Controller 19 can preferably communicate to an oilfield worker the status of the standing pilot ignition system and temperature sensor values, for example using wireless communication between the controller and the worker's smartphone. This communication may be enabled through a cellular network to a server with which both the controller and the smartphone communicate, by a wireless local area network, or by any other means. In some embodiments, a simple system of communicating status to personnel on site is provided, including but not limited to colored LED lights mounted on controller 19. The status items to be communicated may include burner status, battery level, operational modes, fuel pressure status and any system faults. To simplify controller 19 and utilize only one alarm LED, the different modes, statuses and faults may optionally be communicated as a series of flashes with a standard pause between each series.

The present invention preferably comprises one or more devices to recharge the batteries for the electronic spark ignition system. The most common means to recharge batteries is using solar panel 22. Solar panel 22 and the battery are preferably sized to provide more than minimally sufficient average power to maintain sufficient stored energy given the seasonal weather at the location. Other means of recharging the battery may be advantageous in some installations. For example, a thermoelectric power generator that is exposed to high temperature on one side and cold temperature on the other side (i.e. a heat source and heat sink) will generate current. When the burner or standing pilot is burning, a source of heat is available. The wall of the separator or other metal components not directly exposed to heat can provide the cold side heat sink. This source of electrical energy may be preferred if exposure to sunlight is not reliable. However, if the burner has not been operating for an extended period of time the burner region may not be hot enough. As such, a thermoelectric power generation approach may not provide high reliability. Alternatively, a small wind turbine could also be used to generate power, but this means of generating power is not normally as reliable as solar power.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A system for managing a separator pilot burner, the system comprising:
   a flame sensor;
   an ignition element;
   a support for holding said flame sensor and said ignition element;
   a clamp for clamping said support to the pilot burner;
   a first sensor, said first sensor configured to measure a property of fuel being supplied to the pilot burner;
   a controller;
   a first bypassable electronic valve for controlling a flow of fuel to the pilot burner;
   a pneumatic thermostat configured to measure the temperature within the separator;
   a pressure open valve configured to use an output of the pneumatic thermostat to control a flow of fuel to a separator main burner; and
   a second bypassable electronic valve installed between the pneumatic thermostat and the pressure open valve;
   wherein the system does not comprise an electronic temperature sensor for monitoring a temperature within the separator.

2. The system of claim 1 comprising a feedthrough for passing electrical wiring between said controller and both said flame sensor and said ignition element through a burner housing access port plate.

3. The system of claim 2 wherein said feedthrough mounts said controller to the burner housing access port plate.

4. The system of claim 1 wherein said first sensor is a flow sensor or a pressure sensor.

5. The system of claim 1 wherein said first bypassable electronic valve is a non-venting latching solenoid valve.

6. The system of claim 1 wherein said second bypassable electronic valve is a three-way venting latching solenoid valve.

7. The system of claim 1 wherein the pneumatic thermostat and the pressure open valve were originally installed on the separator.

8. The system of claim 1 comprising a second sensor, said second sensor configured to measure a property of fuel being supplied to a separator main burner.

9. The system of claim 8 wherein said second sensor is installed downstream of the pressure open valve.

10. The system of claim 9 wherein said second sensor is a flow sensor or a pressure sensor.

11. The system of claim 8 wherein said second sensor is a pressure sensor installed upstream of said second bypassable electronic valve.

12. The system of claim 11 comprising a third sensor installed downstream of said second bypassable electronic valve, said third sensor being a pressure sensor.

13. The system of claim 12 wherein said second sensor and said third sensor are wired in parallel.

14. The system of claim 1 comprising a pressure transducer installed downstream of the pneumatic thermostat.

15. The system of claim 1 comprising liquid-tight flexible conduit containing electrical wiring between said controller and system components installed outside a body of the separator.

* * * * *